United States Patent
Chang

(10) Patent No.: US 8,478,963 B2
(45) Date of Patent: Jul. 2, 2013

(54) METHOD OF DYNAMICALLY SWITCHING PARTITIONS, MEMORY CARD CONTROLLER AND MEMORY CARD STORAGE SYSTEM

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 243 days.

(21) Appl. No.: 12/780,205

(22) Filed: May 14, 2010

(65) Prior Publication Data

US 2011/0252191 A1 Oct. 13, 2011

(30) Foreign Application Priority Data

Apr. 7, 2010 (TW) .............................. 99110755 A

(51) Int. Cl.
*G06F 12/00* (2006.01)
(52) U.S. Cl.
USPC .................... 711/173; 711/170; 711/E12.068
(58) Field of Classification Search
None
See application file for complete search history.

(56) References Cited

U.S. PATENT DOCUMENTS

| 2007/0259691 A1* | 11/2007 | Santos Garcia | 455/558 |
| 2008/0276065 A1* | 11/2008 | Jeong | 711/173 |
| 2009/0125645 A1* | 5/2009 | Prevost et al. | 710/13 |

FOREIGN PATENT DOCUMENTS

CN 101211313 7/2008

OTHER PUBLICATIONS

"First Office Action of China counterpart application" issued on Mar. 29, 2013, p1-p9, in which the listed reference was cited.

* cited by examiner

*Primary Examiner* — Reginald Bragdon
*Assistant Examiner* — Thanh D Vo
(74) *Attorney, Agent, or Firm* — J.C. Patents

(57) ABSTRACT

A method of dynamically switching partitions for a memory card having a plurality of physical blocks is provided. The method includes configuring logical blocks for mapping to at least a portion of the physical blocks and dividing the logical blocks into first and second partitions; coupling the memory card to a host system and setting CSD corresponding to the memory card as a first default value corresponding to the first partition, wherein the host system requests the CSD to obtain the first default value and accesses the first partition according to the first default value; and setting the CSD corresponding to the memory card as a second default value corresponding to the second partition in response to a switch command from the host system, wherein the host system re-requests the CSD to obtain the second default value and accesses the second partition according to the second default value.

15 Claims, 11 Drawing Sheets

METHOD OF DYNAMICALLY SWITCHING PARTITIONS, MEMORY CARD CONTROLLER AND MEMORY CARD STORAGE SYSTEM

CROSS-REFERENCE TO RELATED APPLICATION

This application claims the priority benefit of Taiwan application serial no. 99110755, filed Apr. 7, 2010. The entirety of the above-mentioned patent application is hereby incorporated by reference herein and made a part of specification.

BACKGROUND

1. Technology Field

The present invention relates to a method of dynamically switching partitions for a memory card, and a memory card controller and a memory card storage system using the same.

2. Description of Related Art

Digital cameras, cells phones, and digital music players have undergone rapid growth in recent years, so that consumer demand for storage media has also rapid increased. Rewritable non-volatile memory is one of the most adaptable memories for such battery-powered portable products due to its characteristics such as data non-volatility, low power consumption, small volume, and non-mechanical structure. A memory card is a storage device adopting NAND flash memory as storage medium. A memory card has been broadly used for storing important personal data thanks to its small volume and large capacity.

The volume of a storage device adopting NAND flash memory as storage medium is very small, and therefore a risk of losing the storage device is relative higher. In order to prevent important data stored in this kind of the storage device from being read by a un-authorization user due to a loss of the storage device, several encryption or authentication techniques are developed for protecting the important data stored in the storage device. For example, taking a flash drive as an example, the memory of the flash drive can be divided into a general partition and a security partition, wherein a user accesses data stored in the security partition only after the user has passed an identification authentication. Accordingly, the user can select to only use the general partition or pass the identification authentication for using the security partition according to his/her desire. However, according to the standard of a memory card (e.g., a secure digital (SD) memory card and a multi media card (MMC), etc.), the memory card can not support the function for a plurality of partitions. Namely, the storage spaces of the memory card can not be formatted into a plurality of partitions for accessing by a host system. Accordingly, the storage spaces of the memory card only are formatted into one partition and a data protect function (i.e., a write protect mode) of the memory card is started or not with the entire partition. Therefore, in order to protect some important data, a user of a memory card must set the storage mode of the entire partition of the memory card into the write protect mode, so that the user is requested to pass the identification authentication whenever his/her is about to use the memory card and thus it causes inconvenience for using. Thereby, how to implement a plurality of partitions in a memory card is one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a method of dynamically switching partitions, which is capable of dynamically switching a plurality of partitions formatted in a memory card.

The present invention is directed to a memory card storage system capable of dynamically switching a plurality of partitions formatted in a memory card.

The present invention is directed to a memory card controller capable of dynamically switching a plurality of partitions formatted in a memory card.

According to an exemplary embodiment of the present invention, a method of dynamically switching partitions for a memory card is provided, wherein the memory card has a memory card controller and a plurality of physical blocks. The method of dynamically switching partitions includes configuring a plurality of logical blocks for mapping to at least a portion of the physical blocks and dividing the logical blocks into a first partition and a second partition by the memory card controller. The method of dynamically switching partitions also includes setting card specific data (CSD) corresponding to the memory card as a first default value corresponding to the first partition by the memory card controller; and requesting the CSD from the memory card controller to obtain the first default value and accessing the first partition according to the first default value by a host system when the memory card is coupled to the host system. The method of dynamically switching partitions still includes receiving a switch command without transmitting a response message corresponding to the switch command to the host system by the memory card controller when the host system transmits the switch command to the memory card controller. The method of dynamically switching partitions still includes setting the CSD of the memory card as a second default value corresponding to the second partition according to the switch command by the memory card controller; and resetting the memory card with an uninterruptible power supply manner by the host system. The method of dynamically switching partitions further includes requesting the CSD from the memory card controller to obtain the second default value and accessing the second partition according to the second default value by the host system after resetting the memory card with the uninterruptible power supply manner.

According to an exemplary embodiment of the present invention, a method of dynamically switching partitions for a memory card is provided, wherein the memory card has a memory card controller and a plurality of physical blocks. The method of dynamically switching partitions includes configuring a plurality of logical blocks for mapping to at least a portion of the physical blocks and dividing the logical blocks into a first partition and a second partition by the memory card controller. The method of dynamically switching partitions also includes setting CSD corresponding to the memory card as a first default value corresponding to the first partition by the memory card controller; and requesting the CSD from the memory card controller to obtain the first default value and accessing the first partition according to the first default value by a host system when the memory card is coupled to the host system. The method of dynamically switching partitions still includes transmitting a switch command to the memory card controller by the host system; and receiving the switch command and transmitting a response message corresponding to the switch command to the host system by the memory card controller. The method of dynamically switching partitions still includes setting the CSD of the memory card as a second default value corresponding to the second partition according to the switch command by the memory card controller. The method of dynamically switching partitions further includes re-requesting the CSD from the memory card controller to obtain the second default value according to the response message and accessing the second partition according to the second default value by the host system.

According to an exemplary embodiment of the present invention, a memory card storage system for executing the above-mentioned the method of dynamically switching partitions is provided, wherein the memory card storage system includes the above-mentioned host system and a memory card. This memory card includes a connector, a memory module and the above-mentioned memory card controller. The connector is configured to couple to the host system, the memory module has a plurality of physical blocks, each of the physical blocks has a plurality of physical pages and the physical pages belonging to the same physical block are written individually and are erased simultaneously.

According to an exemplary embodiment of the present invention, a memory card controller for controlling a memory module of a memory card is provided, wherein the memory module has a plurality of physical blocks, each of the physical blocks has a plurality of physical pages and the physical pages belonging to the same physical block are written individually and are erased simultaneously. This memory card controller includes a host interface, a memory interface and a memory management circuit. The host interface is configured to couple to a host system and the memory interface is configured to couple to the memory module. The memory management circuit is coupled to the host interface and the memory interface, and configured for configuring a plurality of logical blocks for mapping to at least a portion of the physical blocks and dividing the logical blocks into a first partition and a second partition. The memory management circuit is further configured for setting CSD corresponding to the memory card as a first default value corresponding to the first partition. Additionally, the memory management circuit is further configured for receiving a switch command and not transmitting a response message corresponding to the switch command to the host system. Moreover, the memory management circuit is further configured for setting the CSD corresponding to the memory card as a second default value corresponding to the second partition according to the switch command.

According to an exemplary embodiment of the present invention, a memory card controller for controlling a memory module of a memory card is provided, wherein the memory module has a plurality of physical blocks, each of the physical blocks has a plurality of physical pages and the physical pages belonging to the same physical block are written individually and are erased simultaneously. This memory card controller includes a host interface, a memory interface and a memory management circuit. The host interface is configured to couple to a host system and the memory interface is configured to couple to the memory module. The memory management circuit is coupled to the host interface and the memory interface, and configured for configuring a plurality of logical blocks for mapping to at least a portion of the physical blocks and dividing the logical blocks into a first partition and a second partition. The memory management circuit is further configured for setting CSD corresponding to the memory card as a first default value corresponding to the first partition. And, the memory management circuit is further configured for receiving a switch command and transmitting a response message corresponding to the switch command to the host system. Moreover, the memory management circuit is further configured for setting the CSD corresponding to the memory card as a second default value corresponding to the second partition according to the switch command.

According to an exemplary embodiment of the present invention, a computer program product is provided, wherein the computer program product has computer readable program codes and the computer readable program codes is loaded to a computer system to perform a method of dynamically switching partitions for a memory card. The method of dynamically switching partitions includes transmitting a switch command to the memory card; determining whether a response message corresponding to the switch command is received from the memory card; and resetting the memory card with an uninterruptible power supply manner when the response message corresponding to the switch command is not received from the memory card.

Based on the above, the exemplary embodiments of the present invention can divide the storage spaces of a memory card into a plurality of partitions and dynamically switch the partitions based on a request from a host system.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
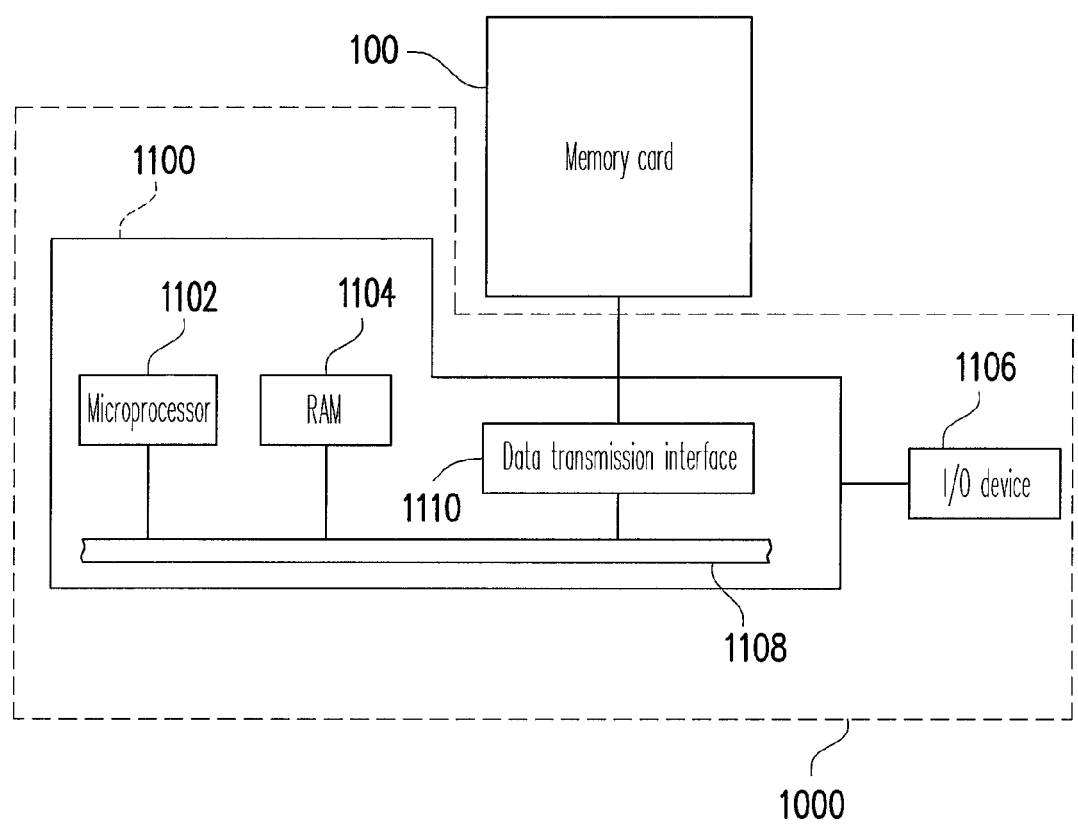
FIG. 1A is a schematic block diagram of a host system using a memory card according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

FIG. 1A is a schematic block diagram of a host system using a memory card according to a first exemplary embodiment of the present invention.

Figure 1B:
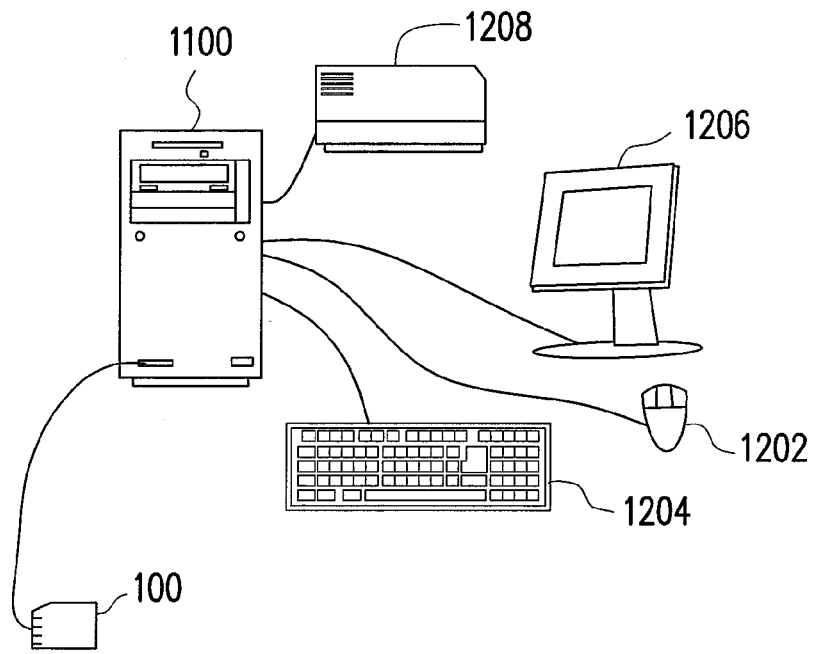
FIG. 1B illustrates a diagram of a computer, an input/output (I/O) device, and a memory card according to an exemplary embodiment of the invention.

Referring to FIG. 1A, a host system 1000 includes a computer 1100 and an input/output (I/O) device 1106. The computer 1100 includes a microprocessor 1102, a random access memory (RAM) 1104, a system bus 1108 and a data transmission interface 1110. The I/O device 1106 includes a mouse 1202, a keyboard 1204, a display 1206, and a printer 1208 as shown in FIG. 1B. It should be noted that the devices in FIG. 1B do not limit the I/O device 1106; the I/O device 1106 may include other devices.

In the exemplary embodiment of the present invention, a memory card 100 is coupled to the devices of the host system 1000 through the data transmission interface 1110. By using the microprocessor 1102, the random access memory (RAM) 1104 and the Input/Output (I/O) device 1106, the data can be write into the memory card 100 or can be read from the memory card 100.

Figure 1C:
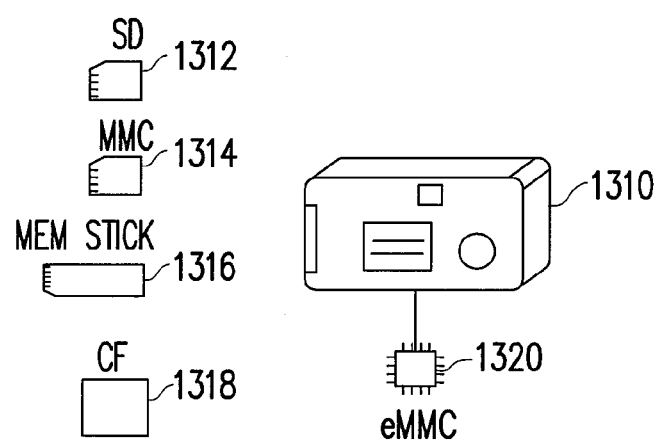
FIG. 1C is a diagram of a host system and a memory card according to another exemplary embodiment of the present invention.

Generally, the host system 1000 substantially could be any system capable of storing data. Even though the host system 1000 is described as a computer system in the present exemplary embodiment, in another exemplary embodiment of the present invention, the host system 1000 may also be a digital camera, a video camera, a communication device, an audio player, or a video player, and etc. For example, if the host system is a digital camera (video camera) 1310, the memory card is then a SD card 1312, a MMC card 1314, a memory stick 1316, a CF card 1318 or an embedded storage device 1320 (as shown in FIG. 1C). It should be noted that the eMMC is directly coupled to the substrate of the host system.

Figure 2:
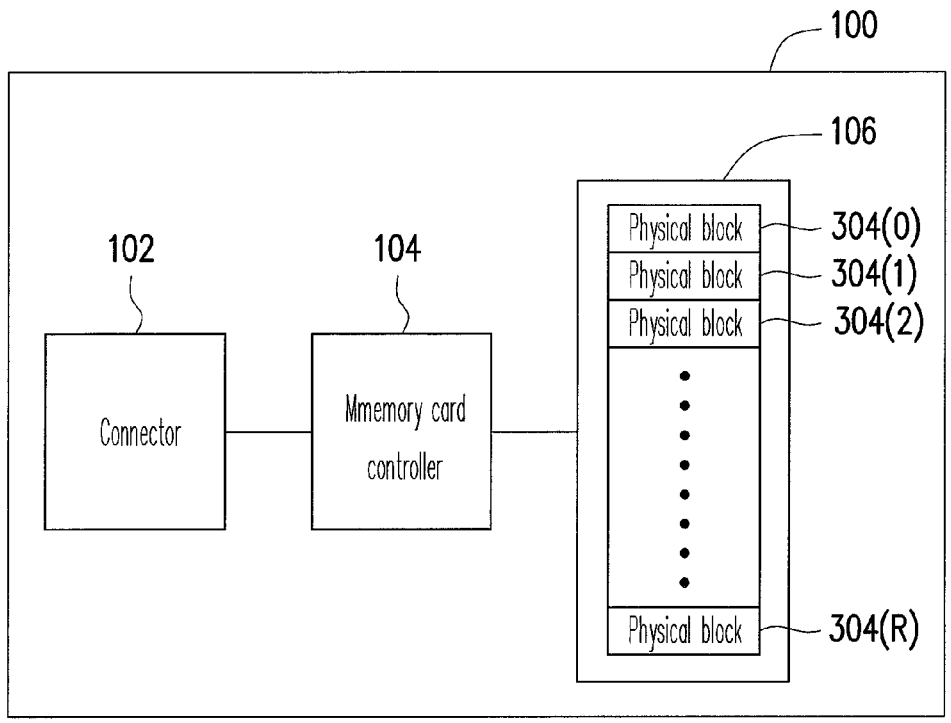
FIG. 2 is a schematic block diagram of the memory card in FIG. 1A.

FIG. 2 is a schematic block diagram of the memory card in FIG. 1A.

Referring to FIG. 2, the memory card 100 includes a connector 102, a memory card controller 104, and a memory module 106.

In the present exemplary embodiment, the connector 102 is a secure digital (SD) interface connector. However, it should be noticed that the present invention is not limited to the aforementioned description and the connector 102 also can be a memory stick (MS) interface connector, a multi-media-card (MMC) interface connector, a compact flash (CF) interface connector or other suitable type of connectors.

The memory card controller 104 executes a plurality of logic gates or control instructions implemented in a hardware form or a firmware form and performs various memory management and access operations such as data writing, reading, and erasing in the memory module 106 according to commands from the host system 1000. In particular, the memory card controller 104 is configured for executing a method of dynamically switching partitions according to the present exemplary embodiment.

The memory module 106 is coupled to the memory card controller 104 and configured for storing data written by the host system 1000. The memory module 106 includes physical blocks 304(0)~304(R). Each of the physical blocks has a plurality of physical pages, wherein the physical pages belonging to the same physical block can be written individually and must be erased simultaneously. In detail, each physical block is the smallest erasing unit. Namely, each physical block contains the least number of memory cells that are erased together. And, one physical page is the smallest programming unit. Namely, each physical page is the smallest unit for writing data.

In this exemplary embodiment, the memory module 106 is a rewritable non-volatile memory module. For example, the memory module 106 is a multi-level cell (MLC) NAND flash memory module. However, the present invention is not limited thereto, and the memory module 106 may also be a single level cell (SLC) NAND flash memory module, other flash memory module or other memory module having the same characteristic.

Figure 3:
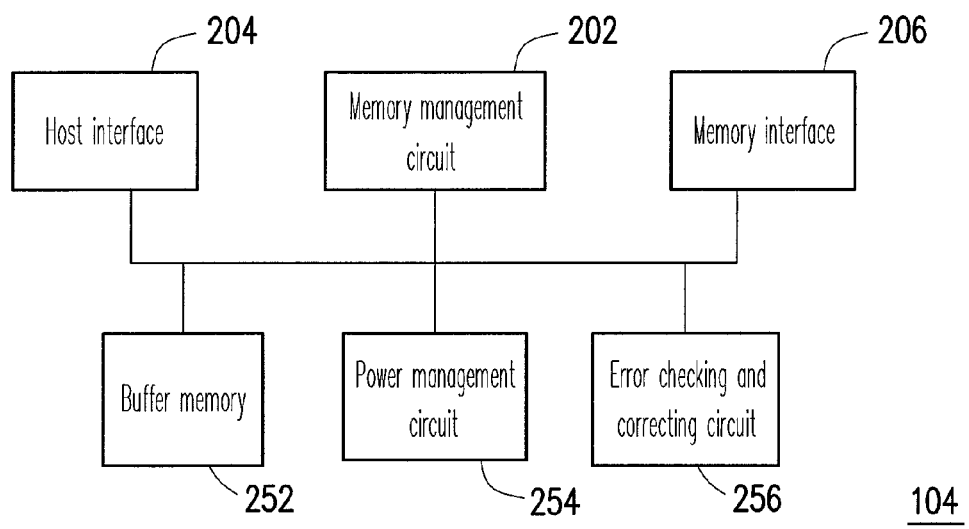
FIG. 3 is a schematic block diagram of a memory card controller according to the first exemplary embodiment of the present invention.

FIG. 3 is a schematic block diagram of a memory card controller according to the first exemplary embodiment of the present invention.

Referring FIG. 3, the memory card controller 104 includes a memory management circuit 202, a host interface 204 and a memory interface 206.

The memory management circuit 202 is configured for controlling the whole operation of the memory card controller 104. To be specific, the memory management circuit 202 has a plurality of control instructions, and the control instructions are executed to control the memory module 106 according to the memory management and access operations and the method of dynamically switching partitions during the memory card 100 is in operations. The memory management and access operations and the method of dynamically switching partitions will be described with drawings in the following.

In the present exemplary embodiment, the control instructions of the memory management circuit 202 are implemented in a firmware form. For example, the memory management circuit 202 has a micro-processor unit (not shown) and a read-only memory (not shown), and these control instructions are burned in the read-only memory. When the memory card 100 is in operations, the control instructions are executed by the micro-processor unit to accomplish the method of dynamically switching partitions and the memory management and access operations of the present exemplary embodiment.

In another exemplary embodiment of the present invention, the control instructions of the memory management circuit 202 are stored in a specific area (for example, the system area of the memory module exclusively used for storing system data) of the memory module 106 as program codes. Additionally, the memory management circuit 202 may have a micro-processor unit (not shown), a read-only memory (not shown) and a random access memory (not shown). And, the read-only memory has a driver code, and when the memory card controller 104 is enabled, the micro-processor unit executes the driver code to load the control instructions of the memory management circuit 202 stored in the memory module 106 into the random access memory of the memory management circuit 202. Then, the micro-processor unit runs these control instructions to accomplish the method of dynamically switching partitions and the memory management and access operations of the present exemplary embodiment. Additionally, the control instructions of the memory management circuit 202 may be implemented in a hardware form.

The host interface 204 is coupled to the memory management circuit 202, and configured for receiving and identifying commands and data from the host system 1000. Namely, the commands and data from the host system 1000 are transmitted to the memory management circuit 202 through the host interface 204. In the present exemplary embodiment, the host interface 204 is a SD interface corresponding to the connector 102. Nevertheless, it should be understood that the present invention is not limited thereto, and the host interface 204 may be a MS interface, a MMC interface, a CF interface or other suitable data transmission interface.

The memory interface 206 is coupled to the memory management circuit 202 and configured for accessing the memory module 106. Namely, data to be written into the memory module 106 is converted by the memory interface 206 into a format acceptable to the memory module 106.

In another exemplary embodiment of the present invention, the memory card controller 104 still includes a random access memory 252. The random access memory 252 is coupled to the memory management circuit 202 and configured to temporarily store data and commands from the host system 1000 or data from the memory module 106. For example, the random access memory 252 may be a static random access memory (SRAM), a dynamic random access memory (DRAM) or other suitable random access memory.

In another exemplary embodiment of the present invention, the memory card controller 104 still includes a power management circuit 254. The power management circuit 254 is coupled to the memory management circuit 202 and configured for controlling the power of the memory card 100.

In another exemplary embodiment of the present invention, the memory card controller 104 still includes an error checking and correcting circuit 256. The error checking and correcting circuit 256 is coupled to the memory management circuit 202, and configured for executing an error checking and correcting procedure to ensure data accuracy. To be specific, when the memory management circuit 202 receives a write command from the host system 1000, the error checking and correcting circuit 256 generates an error checking and correcting (ECC) code for data corresponding to the write command, and the memory management circuit 202 writes the data and the corresponding ECC code into the memory module 106. Subsequently, when the memory management circuit 202 reads the data from the memory module 106, the memory management circuit 202 simultaneously reads the corresponding ECC code, and the error checking and correcting circuit 256 executes the ECC procedure for the read data based on the corresponding ECC code.

Figure 4:
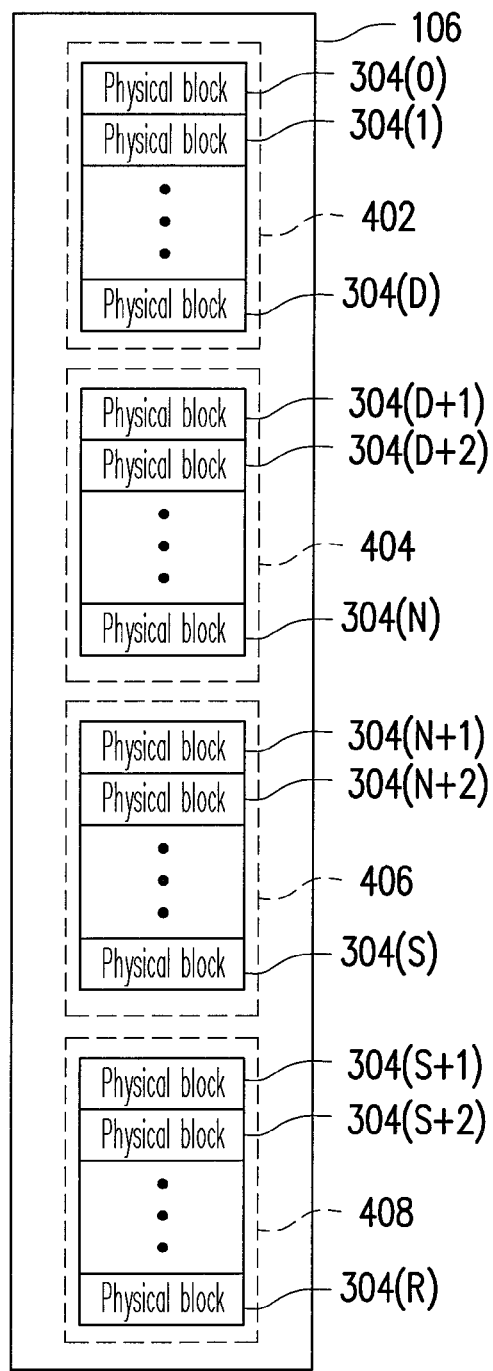
FIGS. 4 and 5 are exemplary diagrams of managing a memory module according to the first exemplary embodiment of the present invention.
Figure 5:
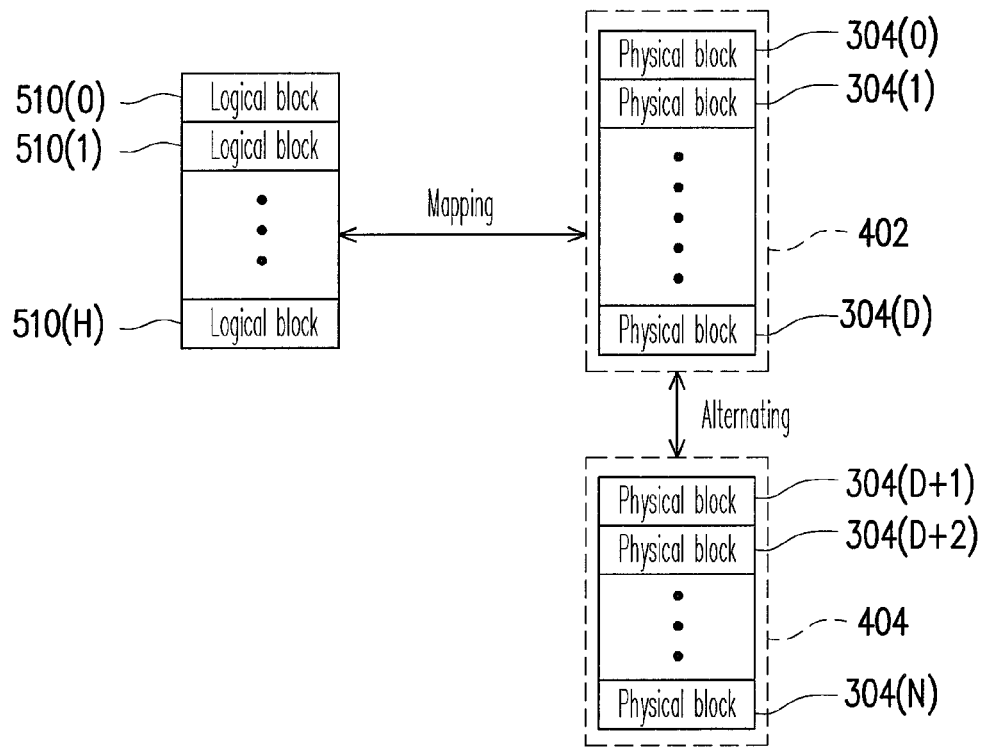

FIGS. 4 and 5 are exemplary diagrams of managing a memory module according to the first exemplary embodiment of the present invention.

It should be understood that the terms used herein for describing the operations (for example, "get", "select", "replace", "group", and "alternate", etc) performed on the physical blocks of the memory module 106 refer to logical operations performed on these physical blocks. Namely, the physical blocks in the memory module 106 are only logically operated and the actual positions thereof are not changed.

Referring to FIG. 4, the memory management circuit 202 logically groups the physical blocks 304(0)~304(R) of the memory module 106 into a data area 402, a spare area 404, a system area 406 and a replacement area 408.

The physical blocks of the data area 402 and the spare area 404 are used for storing data written by the host system 1000. To be specific, the physical blocks of the data area 402 are physical blocks which have been used for storing data, and the physical blocks of the spare area 404 are physical blocks which are used for substituting the physical blocks of the data area 402. Hence, the physical blocks of the spare area 404 are either blank or available blocks (i.e., no data is recorded in these blocks or data recorded in these blocks is marked as invalid data). That is, the physical blocks of the spare area 404 have been operated by an erasing operation, or when a physical block of the spare area 404 is gotten for storing data, the gotten physical block needs to be operated by the erasing operation first. Hence, the physical blocks of the spare area 404 are available physical blocks.

The physical blocks logically belonging to the system area 406 are used for recording system data, which includes information related to the manufacturer and a model of the memory module, the number of the zones in each memory module, the number of the physical blocks in each zone, the number of the physical pages in each physical block, and so forth.

The physical blocks logically belonging to the replacement area 408 are replacement physical blocks. For example, when the memory module 106 is manufactured in the factory, 4% of the physical blocks thereof are reserved for replacement. Namely, when any physical block in the data area 402, the spare area 404, and the system area 406 is damaged, a physical block in the replacement area 408 is used for replacing the damaged physical block (i.e., the bad block). Thus, if there are still normal physical blocks in the replacement area 408 and a physical block is damaged, the memory management circuit 202 gets a normal physical block from the replacement area 408 for replacing the damaged physical block. If there is no more normal physical block in the replacement area 408 and a physical block is damaged, the memory card 100 is announced as being at a write protect status (i.e., the memory management circuit 202 sets the storage mode of the storage spaces of the memory card 100 as the write protect mode) and cannot be used for writing data anymore.

In particular, the numbers of physical blocks in the data area 402, the spare area 404, the system area 406 and the replacement area 408 are various based on different memory module standards. Additionally, it has to be understood that the grouping relationships of grouping the physical blocks into the data area 402, the spare area 404, the system area 406 and the replacement area 408 are dynamically changed during the operations of the memory card 100. For example, when a physical block of the spare area 404 is damaged and replaced by a physical block of the replacement area 408, the physical block of the replacement area 408 is associated with the spare area 404.

Referring to FIG. 5, as described above, the physical blocks of the data area 402 and the spare area 404 are alternated to store data written by the host system 1000. In the present exemplary embodiment, the memory management circuit 202 configures logical access addresses to host system 1000 for properly accessing data in the physical blocks storing data with the above-mentioned alternate manner. In particular, in order to manage the written data with the erasing unit (i.e., each physical block) of the memory module 106, the memory management circuit 202 groups the configured logical access addresses into logical blocks 510(0)~510(H) and maps the logical blocks 510(0)~510(H) to the physical blocks of the data area 402. For example, when the memory card 100 is initiated (e.g., formatted), the logical blocks 510(0)~510(H) map to the physical blocks 304(0)~304(D) of the data area 402, respectively. That is, one logical block maps to one physical block in the data area 402. Herein, the memory management circuit 202 establishes a logical block-physical block mapping table for recoding mapping relationships between the logical blocks and the physical blocks.

In the present exemplary embodiment, the memory management circuit 202 divides the logical blocks 510(0)~510(H) into a plurality of partitions and dynamically provides information relating to one of the partitions to the host system 1000 for accessing the partition according to a request from the host system 1000.

Figure 6:
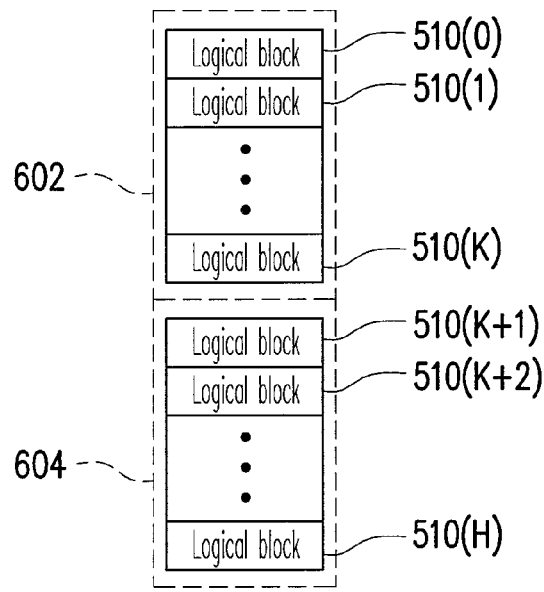
FIG. 6 is a diagram illustrating an example of dividing logical blocks according to the first embodiment of the present invention.

FIG. 6 is a diagram illustrating an example of dividing logical blocks according to the first embodiment of the present invention.

Referring to FIG. 6, the memory management circuit 202 logically divides the logical blocks 510(0)~510(H) into a first partition 602 and a second partition 604, wherein the first partition 602 is constituted of the logical blocks 510(0)~510(K) and the second partition 604 is constituted of the logical blocks 510(K+1)~510(H).

In the present exemplary embodiment, the memory management circuit 202 sets a first default value for the first partition 602 and the first default value is used for card specific data (CSD) corresponding to the memory card 100. To be specific, the standard for the memory card defines a CSD register for recording the CSD of the memory card 100, and when the memory card is coupled to the host system 1000, the host system 1000 obtains the CSD from the CSD register of the memory card 100 and accesses the storage spaces of the memory card 100 according to the obtained CSD. Herein, the CSD register includes a BLOCK_LEN field, a C_SIZE field and a C_SIZE_MULT field to define the capacity of the memory card 100. For example, in the present exemplary embodiment, the capacity of the first partition 602 is 2 gigabytes (GB), and thus the BLOCK_LEN field, the C_SIZE field and the C_SIZE_MULT field is recorded respectively with 1024, 4095 and 7 in the first default value corresponding to the first partition 602. Accordingly, when the host system 1000 recognizes the memory card 100 according to the first default value, the host system 1000 could access the first partition 602 and the capacity of the available storage spaces thereof is 2 GB.

Similarly, the memory management circuit 202 set a second default value for the second partition 604 and the second default is also used for the CSD corresponding to the memory card 100. For example, in the present exemplary embodiment, the capacity of the second partition 604 is 32 megabytes (MB), and thus the BLOCK_LEN field, the C_SIZE field and the C_SIZE_MULT field is recorded respectively with 512, 2000 and 3 in the second default value corresponding to the second partition 604. Accordingly, when the host system 1000 recognizes the memory card 100 according to the second default value, the host system 1000 could access the second partition 604 and the capacity of the available storage spaces thereof is 32 MB.

As described above, one memory card only supports one partition in the standard of the memory card. In the present exemplary embodiment, the memory management circuit 202 initially sets the CSD corresponding to the memory card 100 as the first default value corresponding to the first partition, such that the host system 1000 obtains the first default value from the CSD register and accesses the first partition 602 according to the first default value whenever the memory card 100 is coupled to the host system 1000. Additionally, the memory management circuit 202 sets the CSD corresponding to the memory card 100 as the second default value corresponding to the second partition according to a switch command from the host system 1000, such that a partition that can be accessed by the host system 1000 is switched to the second partition 604.

To be specific, under a status where the memory card 100 is coupled to the host system 1000 and a partition that can be accessed by the host system 1000 is the first partition 602, when the host system 1000 transmits the switch command to the memory card 100, the memory management circuit 202 recognizes the switch command and does not transmit a response message to the host system 1000 in response to the switch command.

Additionally, the memory management circuit 202 records a switch flag in the random access memory 252 in response to the switch command. In particular, under a status where the host system 1000 receives no any response message corresponding to this switch command, the host system 1000 resets the memory card 100 with an uninterruptible power supply manner (i.e., the power supply for the memory card 100 is not cut off). After the memory card 100 is reset, the memory management circuit 202 sets the CSD in the CSD register as the second default value according to the switch flag. Then, when the host system 1000 is about to obtain the CSD corresponding to the memory card 100 from the CSD register, the host system 1000 obtains the second default value and accesses the second partition 604 according to the second default value.

To be specific, after the host system 1000 resets the memory card 100, the host system 1000 re-obtains related information of the memory card 100 through several commands. For example, taking the standard of the SD memory card as an example, the host system 1000 first gives an ACMD41 command for confirming whether the memory card 100 is busy and confirming the range of the voltage supplied to the memory card 100. Then, the host system 1000 gives a CMD2 command and then the memory card controller 104 returns CID information in response to the CMD2 command. After that, the host system 1000 gives a CMD3 command and then the memory card controller 104 returns a related card address of the memory card 100.

That is, in the present exemplary embodiment, the switch command is designed specially for the host system 1000 and the memory card 100 to enable the switch for partitions. Under the situation where the switch command is received, the memory management circuit 202 does not transmit any response message corresponding to the switch command to the host system 1000 and changes the CSD in the CSD register. Besides, under the situation where the host system 1000 does not receive the response message corresponding to the switch command, the host system 1000 resets the memory card 100 with the uninterruptible power supply manner and re-obtains the CSD corresponding to the memory card 100 from the CSD register.

Particularly, when the memory card 100 is powered off (i.e., the power supply for the memory card 1000 is cut off) and re-coupled to the host system 1000, because the switch flag recorded in the random access memory 252 is volatile, the memory management circuit 202 identifies that no switch flag in the random access memory 252 and initially sets the CSD in the CSD register as the first default value. Accordingly, when the host system 1000 is about to obtain the CSD corresponding to the memory card 100 from the CSD register, the host system 1000 obtains the first default value and accesses the first partition 602 according to the obtained first default value.

In addition, in another exemplary embodiment of the present invention, under the status where the memory management circuit 202 sets the CSD in the CSD register as the second default value according to the switch flag, the memory management circuit 202 counts time for a predetermined period and determines whether any command is received from the host system 1000 during the predetermined period. In particular, if no command is received from the host system 1000 during the predetermined period, the memory management circuit 202 sets the CSD in the CSD register as the first default value. Then, when the host system 1000 is about to access the memory card 100, the memory management circuit 202 transmits an error message to the host system 1000, such that the host system 1000 re-reads the CSD for accessing the first partition 602.

For example, in the present exemplary embodiment, when the host system 1000 transmits the switch command to the memory card 100, the memory management circuit 202 executes an authentication procedure for authenticating whether the host system 1000 has an authorization for accessing the second partition 604. For example, the memory management circuit 202 requests the host system 1000 to transmit a user password and compares the received user password and a predetermined password (e.g., the predetermined password is stored in the system area). And, the memory management circuit 202 records the switch flag in the random access memory 252 only when the host system 1000 passes the authentication procedure (e.g., the received user password is identical to the predetermined password). It should be noted that the authentication procedure is not limited to the comparing of passwords, and in another exemplary embodiment, the authentication procedure is executed by comparing bio-characteristic information (e.g., fingerprints).

Figure 7:
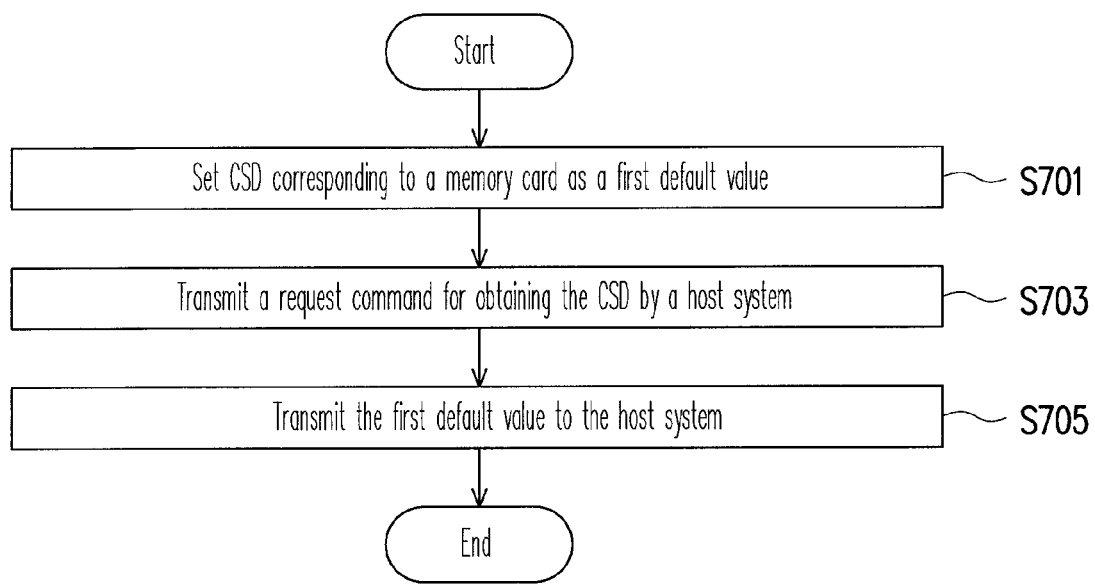
FIG. 7 is a flow chart illustrating a portion of a method of dynamically switching partitions according to the first exemplary embodiment of the present invention.
Figure 8:
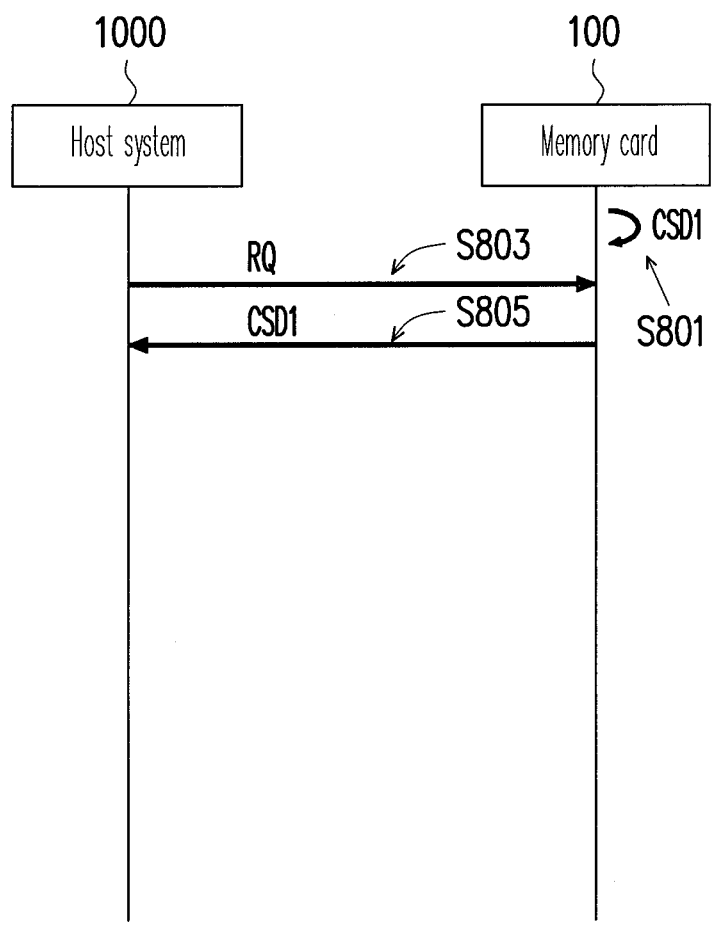
FIG. 8 is a diagram of illustrating information flows between the host system and the memory card according to the first exemplary embodiment of the present invention.

FIG. 7 is a flow chart illustrating a portion of a method of dynamically switching partitions according to the first exemplary embodiment of the present invention, and FIG. 8 is a diagram of illustrating information flows between the host system and the memory card according to FIG. 7.

Referring to FIGS. 7 and 8, when the memory card 100 is coupled to the host system 1000, in step S701, the memory management circuit 202 sets the CSD corresponding to the memory card 100 as the first default value CSD1 (as data flow S801 shown in FIG. 8). Then, in step S703, the host system 1000 transmits a request command RQ for obtaining the CSD (as data flow S803 shown in FIG. 8), and in step S705, the memory management circuit 202 transmits the first default value CSD1 to the host system 1000 (as data flow S805 shown in FIG. 8). At this time, the host system 1000 could access the first partition 602 of the memory card 100 according to the received CSD (i.e., the first default value CSD1).

Figure 9:
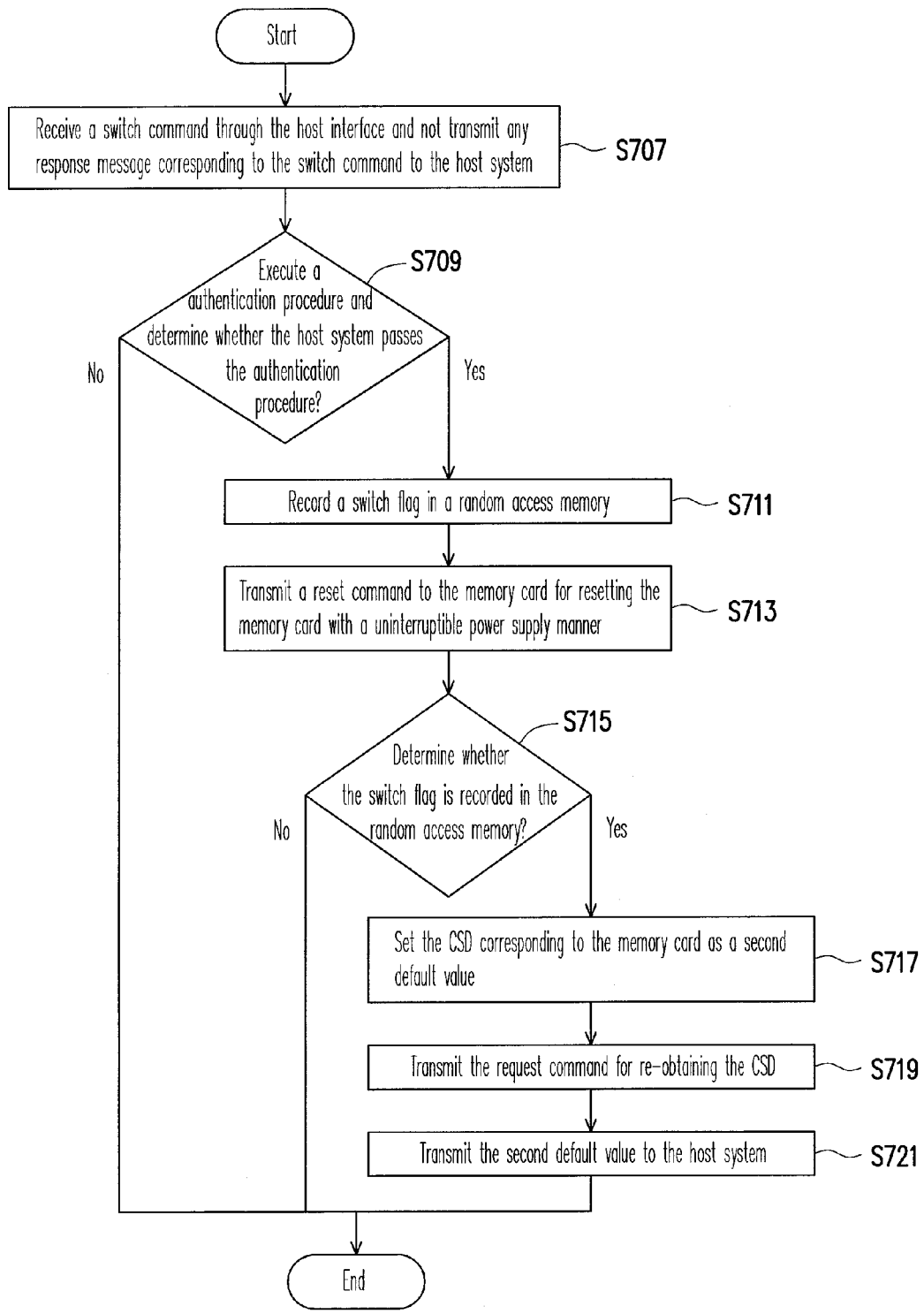
FIG. 9 is a flow chart illustrating another portion of the method of dynamically switching partitions according to the first exemplary embodiment of the present invention.
Figure 10:
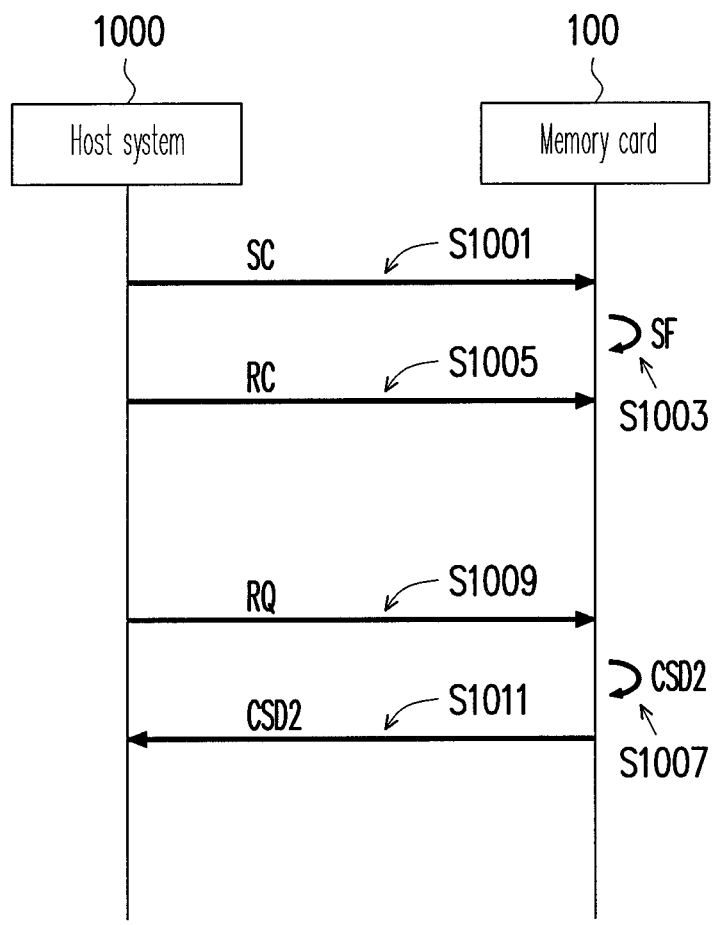
FIG. 10 is a diagram of illustrating information flows between the host system and the memory card according to FIG. 9.

FIG. 9 is a flow chart illustrating another portion of the method of dynamically switching partitions according to the first exemplary embodiment of the present invention, and FIG. 10 is a diagram of illustrating information flows between the host system and the memory card according to FIG. 9.

Referring to FIGS. 9 and 10, under a status where a partition that could be accessed by the host system 1000 is the first partition 602 of the memory card 100, when the host system 1000 transmits the switch command SC to the memory card 100 (as data flow S1001 shown in FIG. 10), in step S707, the memory management circuit 202 receives the switch command through the host interface 204 and does not transmit any response message corresponding to the switch command to the host system 1000, and in step S709, the memory management circuit 202 executes the authentication procedure and determines whether the host system 1000 passes the authentication procedure.

If the host system 1000 does not pass the authentication procedure, then the process of FIG. 9 is terminated.

If the host system 1000 passes the authentication procedure, in step S711, the memory management circuit 202 records the switch flag SF in the random access memory 252 (as data flow S1003 shown in FIG. 10). After that, in step S713, the host system 1000 transmits a reset command RC to the memory card 100 for resetting the memory card 100 with the uninterruptible power supply manner (as data flow S1005 shown in FIG. 10). After the memory card 100 is reset, in step S715, the memory management circuit 202 determines whether the switch flag is recorded in the random access memory 252.

If the switch flag is recorded in the random access memory 252, in step S717, the memory management circuit 202 sets the CSD corresponding to the memory card 100 as the second default value CSD2 (as data flow S1007 shown in FIG. 10). Then, in step S719, the host system 1000 transmits the request command RQ for re-obtaining the CSD (as data flow S1009 shown in FIG. 10), and in step S721, the memory management circuit 202 transmits the second default value CSD2 to the host system 1000 (as data flow S1011 shown in FIG. 10). At this time, the host system 1000 could access the second partition 604 of the memory card 100 according to the received CSD (i.e., the second default value CSD2).

If the switch flag is not recorded in the random access memory 252, then the process of FIG. 9 is terminated.

It should be mentioned that a computer program product is provided in another exemplary embodiment of the present invention, wherein the computer program product is formed with several computer readable program codes. In particular, when these computer readable program codes are loaded into a computer system, the computer system can executes the operations of transmitting the switch command SC to the memory card 100 and the operations of transmitting the reset command RC for resetting the memory card 100 without receiving the response message corresponding to the switch command SC.

Additionally, the above-mentioned computer program product may be stored on a computer readable recording medium, wherein the computer readable recording medium may be any tangible data storage device to be read by the computer system subsequently. Examples of the computer readable recording medium include a read-only memory (ROM), a random-access memory (RAM), a CD-ROM, a magnetic tape, a floppy disk, and an optical data storage device.

As described above, in the present exemplary embodiment, when the host system 1000 transmits the switch command to the memory card 100, the memory management circuit 202 does not transmit any response message to the host system 1000. Accordingly, the host system 1000 resets the memory card 100 with the uninterruptible power supply manner and re-obtains the CSD without receiving any response message, and thereby a partition accessed currently can be switched dynamically.

Second Exemplary Embodiment

A memory card and a host system of the second exemplary embodiment substantially is the same as the memory card and the host system of the first exemplary embodiment, and only the difference is described as the following. Here, FIGS. 1A, 1B and 3~6 are used for describing the second exemplary embodiment of the present invention.

In the second exemplary embodiment, under the status where the memory card 100 is coupled to the host system 1000 and a partition that can be accessed by the host system 1000 is the first partition 602, when the host system 1000 transmits the switch command to the memory card 100, the memory management circuit 202 transmits a response message corresponding to the switch command to the host system 1000 and sets the CSD in the CSD register as the second default value in response to the switch command. In particular, in a situation where the host system 1000 receives the response message corresponding to the switch command, the host system 1000 re-obtains the CSD in the CSD register. At this time, the host system 1000 obtains the second default value corresponding to the second partition 604 from the memory card 100 and accesses the second partition 604 according to the obtained second default value. That is, in the second exemplary embodiment, this switch command is designed specially for the host system 1000 and the memory card 100 to enable the switch for partitions. And, under a situation where the switch command is received, the memory management circuit 202 transmits the response message corresponding to the switch command to the host system and changes the CSD in the CSD register. Besides, under a situation where the host system 1000 receives the response message corresponding to the switch command, the host system 1000 resets the memory card 100 re-obtains the CSD corresponding to the memory card 100 from the CSD register after a period.

In the second exemplary embodiment, when the memory card 100 is coupled to the host system 1000, the process shown in FIG. 7 is also performed for initially accessing the first partition 602. Additionally, FIG. 11 is a flow chart illustrating another portion of the method of dynamically switching partitions according to the second exemplary embodiment of the present invention, and FIG. 12 is a diagram of illustrating information flows according to FIG. 11.

Figure 11:
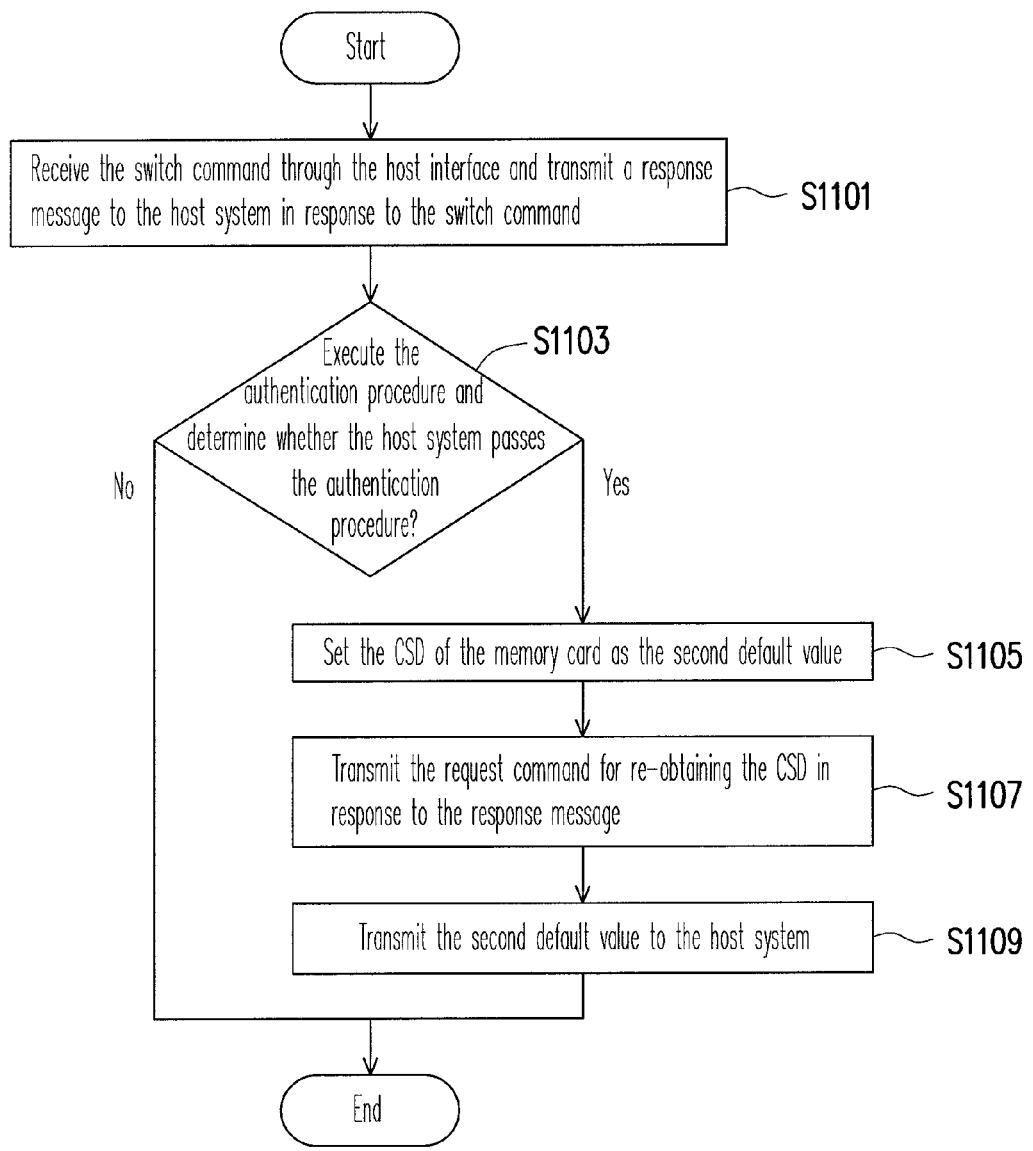
FIG. 11 is a flow chart illustrating another portion of the method of dynamically switching partitions according to a second exemplary embodiment of the present invention.
Figure 12:
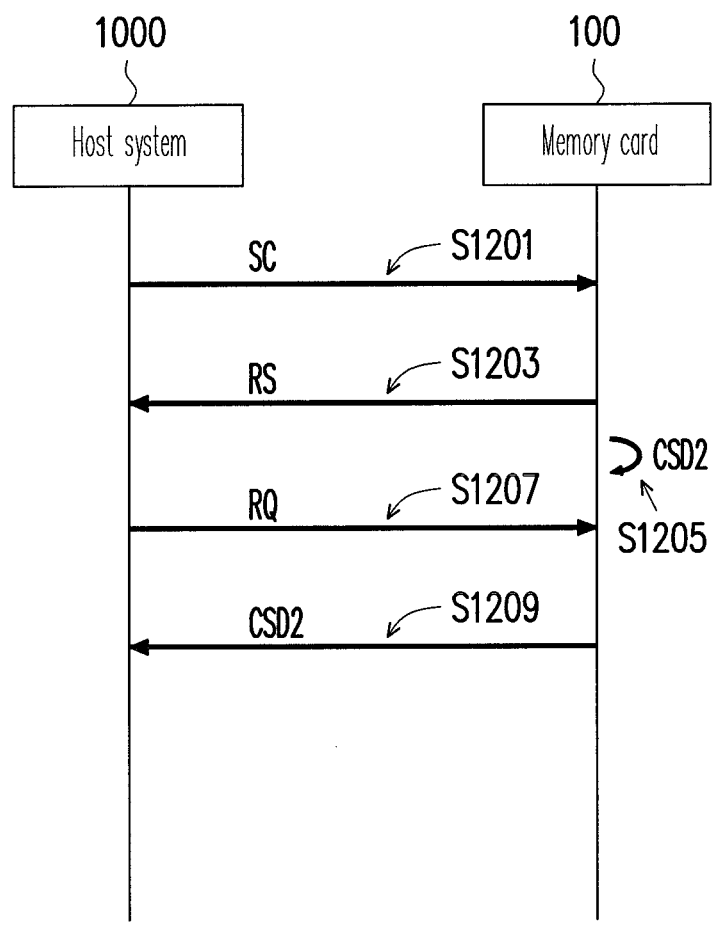
FIG. 12 is a diagram of illustrating information flows between the host system and the memory card according to FIG. 11.

Referring to FIGS. 11 and 12, under the status where a partition that could be accessed by the host system 1000 is the first partition 602 of the memory card 100, when the host system 1000 transmits the switch command SC to the memory card 100 (as data flow S1201 shown in FIG. 12), in step S1101, the memory management circuit 202 receives the switch command through the host interface 204 and transmits the response message RS to the host system 1000 in response to the switch command (as data flow S1203 shown in FIG. 12). And, in step S1103, the memory management circuit 12 executes the authentication procedure and determines whether the host system 1000 passes the authentication procedure.

If the host system 1000 passes the authentication procedure, in step S1105, the memory management circuit 202 sets the CSD of the memory card 100 as the second default value CSD2 (as data flow S1205 shown in FIG. 12). Then, in step S1107, the host system 1000 transmits the request command RQ for re-obtaining the CSD in response to the response message RS (as data flow S1207 shown in FIG. 12), and in step S1109, the memory management circuit 202 transmits the second default value CSD2 to the host system 1000 (as data flow S1209 shown in FIG. 12). At this time, the host system 1000 could access the second partition 604 of the memory card 100 according to the received CSD (i.e., the second default value CSD2).

If the host system 1000 can not pass the authentication procedure, then the process of FIG. 11 is terminated.

In the present exemplary embodiment, when the host system 1000 transmits the switch command to the memory card 100, the memory management circuit 202 transmits the response message to the host system 1000. Accordingly, the host system 1000 re-obtains the CSD in response to the response message, and thereby a partition accessed currently can be switched dynamically.

Based on the above, in the exemplary embodiments of the present invention, the storage spaces of a memory card are divided into a plurality of partitions and these partitions are switched dynamically, such that the host system is capable of accessing different partitions. In addition, by the authentication procedure, only a host system that has authenticated can access a special partition, thereby preventing data that is needed to protect from being accessed by a un-authorization user. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of dynamically switching partitions, for a memory card having a memory card controller and a plurality of physical blocks, the method comprising:

configuring a plurality of logical blocks for mapping to at least a portion of the physical blocks by the memory card controller;

dividing the logical blocks into a first partition and a second partition by the memory card controller;

setting a card specific data (CSD) corresponding to the memory card as a first default value corresponding to the first partition by the memory card controller;

requesting the CSD corresponding to the memory card by a host system, so as to obtain the first default value from the memory card when the memory card is coupled to the host system, wherein the host system can recognize and access the first partition based on the first default value;

transmitting a switch command to the memory card controller by the host system;

receiving the switch command from the host system by the memory card controller;

recording a switch flag in a random access memory of the memory card as well as not transmitting a response message corresponding to the switch command to the host system by the memory card controller in response to the switch command;

resetting the memory card with an uninterruptible power supply manner by the host system in response to not transmitting the response message corresponding to the switch command by the memory card controller;

determining whether the switch flag is recorded in the random access memory by the memory card controller after the memory card is reset;

setting the CSD corresponding to the memory card as a second default value corresponding to the second partition by the memory card controller if the switch flag is recorded in the random access memory after the memory card is reset; and re-requesting the CSD corresponding to the memory card by the host system, so as to obtain the second default value from the memory card after the CSD corresponding to the memory card is set as the second default value corresponding to the second partition, wherein the host system can recognize and access the second partition based on the second default value.

2. The method of dynamically switching partitions according to claim 1, further comprising:

setting the CSD corresponding to the memory card as the first default value corresponding to the first partition by the memory card controller when the memory card is powered off and re-coupled to the host system.

3. The method of dynamically switching partitions according to claim 1, further comprising:

performing an authentication procedure for authenticating the host system by the memory card controller; and determining whether the host system passes the authentication procedure, wherein the step of recording a switch flag in a random access memory of the memory card as well as not transmitting the response message corresponding to the switch command to the host system by the memory card controller in response to the switch command is executed when the host system passes the authentication procedure.

4. The method of dynamically switching partitions according to claim 1, further comprising:

counting time for a predetermined period by the memory card controller;

determining whether any command is received from the host system during the predetermined period; and setting the CSD corresponding to the memory card as the first default value corresponding to the first partition by the memory card controller when no command is received from the host system during the predetermined period.

5. A method of dynamically switching partitions, for a memory card having a memory card controller and a plurality of physical blocks, the method comprising:

configuring a plurality of logical blocks for mapping to at least a portion of the physical blocks by the memory card controller;

dividing the logical blocks into a first partition and a second partition by the memory card controller;

setting a card specific data (CSD) corresponding to the memory card as a first default value corresponding to the first partition by the memory card controller;

requesting the CSD corresponding to the memory card by a host system, so as to obtain the first default value from the memory card when the memory card is coupled to the host system, wherein the host system can recognize and access the first partition based on the first default value;

transmitting a switch command to the memory card controller by the host system;

receiving the switch command and transmitting a response message corresponding to the switch command to the host system by the memory card controller;

setting the CSD corresponding to the memory card as a second default value corresponding to the second partition in response to the switch command by the memory card controller; and re-requesting the CSD corresponding to the memory card by the host system, so as to obtain the second default value from the memory card in response to the response message, wherein the host system can recognize and access the second partition based on the second default value.

6. The method of dynamically switching partitions according to claim 5, further comprising:

setting the CSD corresponding to the memory card as the first default value corresponding to the first partition by the memory card controller when the memory card is powered off and re-coupled to the host system.

7. The method of dynamically switching partitions according to claim 5, further comprising:

performing an authentication procedure for authenticating the host system by the memory card controller; and determining whether the host system passes the authentication procedure, wherein the step of setting the CSD corresponding to the memory card as the second default value corresponding to the second partition in response to the switch command is executed when the host system passes the authentication procedure.

8. The method of dynamically switching partitions according to claim 5, further comprising:

counting time for a predetermined period by the memory card controller;

determining whether any command is received from the host system during the predetermined period; and setting the CSD corresponding to the memory card as the first default value corresponding to the first partition by the memory card controller when no command is received from the host system during the predetermined period.

9. A memory card storage system, comprising:

a host system; and a memory card, wherein the memory card comprises:

a connector, configured to couple to the host system;

a memory module, having a plurality of physical blocks, each of the physical blocks has a plurality of physical pages and the physical pages belonging to the same physical block are written individually and are erased simultaneously; and a memory card controller, coupled to the memory module and the connector, and configured to:

configure a plurality of logical blocks for mapping to at least a portion of the physical blocks;

divide the logical blocks into a first partition and a second partition;

set a card specific data (CSD) corresponding to the memory card as a first default value corresponding to the first partition, wherein the host system requests the CSD corresponding to the memory card, so as to obtain the first default value from the memory card, wherein the host system can recognize and access the first partition based on the first default value;

receive a switch command from the host system;

record a switch flag in a random access memory of the memory card as well as not transmitting a response message corresponding to the switch command to the host system in response to the switch command, wherein the host system resets the memory card with an uninterruptible power supply manner in response to not transmitting the response message corresponding to the switch command by the memory card controller;

determine whether the switch flag is recorded in the random access memory by the memory card controller after the memory card is reset; and set the CSD corresponding to the memory card as a second default value corresponding to the second partition if the switch flag is recorded in the random access memory after the memory card is reset, wherein the host system requests the CSD corresponding to the memory card, so as to obtain the second default value from the memory card after the CSD corresponding to the memory card is set as the second default value corresponding to the second partition, wherein the host system can recognize and access the second partition based on the second default value.

10. The memory card storage system according to claim 9, wherein the memory card controller is further configured to set the CSD corresponding to the memory card as the first default value corresponding to the first partition when the memory card is powered off and re-coupled to the host system.

11. The memory card storage system according to claim 9, wherein the memory card controller is further to perform an authentication procedure for authenticating the host system, wherein the memory card controller executes the procedure of recording the switch flag in the random access memory of the memory card as well as not transmitting the response message corresponding to the switch command to the host system by the memory card controller in response to the switch command when the host system passes the authentication procedure.

12. A memory card controller, for controlling a memory module of a memory card, wherein the memory module has a plurality of physical blocks, each of the physical blocks has a plurality of physical pages and the physical pages belonging to the same physical block are written individually and are erased simultaneously, the memory card controller comprising:

a host interface, configured to couple to a host system;

a memory interface, configured to couple to the memory module; and a memory management circuit, coupled to the host interface and the memory interface, wherein the memory management circuit is configured to:

configure a plurality of logical blocks for mapping to at least a portion of the physical blocks;

divide the logical blocks into a first partition and a second partition;

set a card specific data (CSD) corresponding to the memory card as a first default value corresponding to the first partition, wherein the host system can recognize and access the first partition based on the first default value;

receive a switch command from the host system;

record a switch flag in a random access memory of the memory card as well as not transmitting a response message corresponding to the switch command to the host system in response to the switch command;

determine whether the switch flag is recorded in the random access memory by the memory card controller after the memory card is reset; and set the CSD corresponding to the memory card as a second default value corresponding to the second partition if the switch flag is recorded in the random access memory after the memory card is reset, wherein the host system can recognize and access the second partition based on the second default value.

13. The memory card controller according to claim 12, wherein the memory management circuit is further configured to set the CSD corresponding to the memory card as the first default value corresponding to the first partition when the memory card is powered off and re-coupled to the host system.

14. The memory card controller according to claim 12, wherein the memory management circuit is further to perform an authentication procedure for authenticating the host system and determine whether the host system passes the authentication procedure, wherein the memory management circuit executes the procedure of recording the switch flag in the random access memory of the memory card as well as not transmitting the response message corresponding to the switch command to the host system by the memory card controller in response to the switch command when the host system passes the authentication procedure.

15. The memory card controller according to claim 12, wherein the memory management circuit is further to count time for a predetermined period and determine whether any command is received from the host system during the predetermined period, wherein the memory management circuit sets the CSD corresponding to the memory card as the first default value corresponding to the first partition when no command is received from the host system during the predetermined period.

* * * * *